US009718151B2

(12) United States Patent
Ozawa et al.

(10) Patent No.: US 9,718,151 B2
(45) Date of Patent: Aug. 1, 2017

(54) REACTOR MEASUREMENT-PIPE MAINTENANCE CLAMP APPARATUS

(71) Applicant: Kabushiki Kaisha Toshiba, Tokyo (JP)

(72) Inventors: Yusuke Ozawa, Shizuoka-ken (JP); Kunihiko Kinugasa, Kanagawa-ken (JP); Hajime Mori, Kanagawa-ken (JP); Yuki Minato, Tokyo (JP); Masanobu Watanabe, Kanagawa-ken (JP); Hiroyuki Adachi, Tokyo (JP); Tadahiro Mitsuhashi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 66 days.

(21) Appl. No.: 14/338,571

(22) Filed: Jul. 23, 2014

(65) Prior Publication Data

US 2014/0362967 A1 Dec. 11, 2014

Related U.S. Application Data

(63) Continuation of application No. PCT/JP2013/000300, filed on Jan. 23, 2013.

(30) Foreign Application Priority Data

Jan. 27, 2012 (JP) ................. P2012-015710

(51) Int. Cl.
*G21C 13/032* (2006.01)
*B23K 37/053* (2006.01)
(Continued)

(52) U.S. Cl.
CPC ........ *B23K 37/0533* (2013.01); *G21C 13/032* (2013.01); *G21C 19/19* (2013.01);
(Continued)

(58) Field of Classification Search
CPC .................. B23K 37/0533; G21C 13/032
(Continued)

(56) References Cited

U.S. PATENT DOCUMENTS 8,608,121 B2 * 12/2013 Maehara ............. G21C 13/032
248/231.31
2012/0144641 A1 * 6/2012 Minato ..................... F04F 5/54
29/402.12

FOREIGN PATENT DOCUMENTS

JP         2008256586 A    * 10/2008

* cited by examiner

*Primary Examiner* — Jack W Keith
*Assistant Examiner* — Lily C Garner
(74) *Attorney, Agent, or Firm* — Finnegan, Henderson, Farabow, Garrett & Dunner, LLP (57) ABSTRACT

A reactor measurement-pipe maintenance clamp apparatus includes a first clamp mechanism and a second clamp mechanism. The first clamp mechanism includes clamps to fix the measurement pipe between the clamps, first clamp operation bolts that are allowed to be turned by remote control from above a reactor core, and wedge mechanisms to convert the turning of the clamp operation bolts to displacement of the clamps in a radial direction of the diffuser to generate clamping forces for securing the measurement pipe. The second clamp mechanism includes a support clamp to hold the support, a second clamp operation bolt that is allowed to be turned by remote control from above the reactor core, and a wedge mechanism to convert the turning of the second clamp operation bolt to displacement of the support clamp in a tangential direction of the diffuser to generate clamping force for fixing the support.

7 Claims, 8 Drawing Sheets

(51) Int. Cl.
*G21C 19/19* (2006.01)
*G21C 19/20* (2006.01)
G21C 15/25 (2006.01)
G21C 17/032 (2006.01)

(52) U.S. Cl.
CPC .......... *G21C 19/207* (2013.01); *G21C 15/25* (2013.01); *G21C 17/032* (2013.01); *Y02E 30/40* (2013.01)

(58) Field of Classification Search
USPC ........................................................ 376/260
See application file for complete search history.

Fig. 8B    Prior Art

REACTOR MEASUREMENT-PIPE MAINTENANCE CLAMP APPARATUS

CROSS-REFERENCE TO RELATED APPLICATION

This application is based upon and claims the benefit of priority from PCT Application PCT/JP2013-000300, filed Jan. 23, 2013, the entire contents of which are incorporated herein by reference.

FIELD

An embodiment of the present invention relates to a reactor measurement-pipe maintenance clamp apparatus and particularly to a reactor measurement-pipe maintenance clamp apparatus for fixing robustly a measurement pipe that measures a flow rate of a jet pump system.

BACKGROUND

Figure 6:
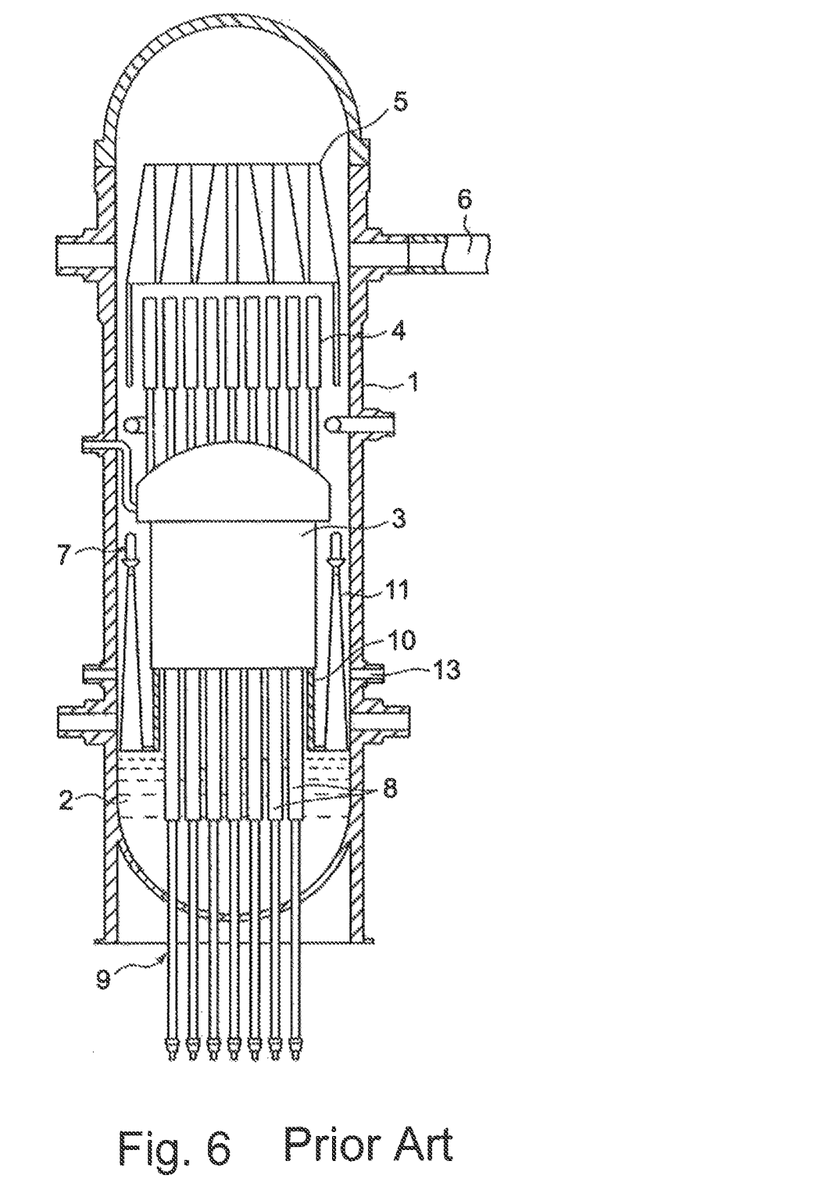
FIG. 6 is a schematic sectional view of the inside of a boiling water reactor.

FIG. 6 is a diagram of a boiling water reactor. To increase power density, the boiling water reactor employs a jet pump system that combines a recirculation pump, provided outside a reactor pressure vessel 1, and jet pumps 11, provided inside the reactor pressure vessel 1.

The reactor pressure vessel 1 accommodates a coolant 2 and a reactor core 3. The reactor core 3 is made up of a plurality of fuel assemblies and a plurality of control rods, and is surrounded by a core shroud 10. The coolant 2 flows through the reactor core 3 upward. While flowing through the reactor core 3, the coolant 2 is heated due to heat produced by nuclear reaction in the reactor core 3, generating two-phase flow of water and steam. The two-phase flow of the coolant 2 flows into a steam separator 4, provided above the reactor core 3, to be separated into water and steam.

The resulting steam is introduced into a steam dryer 5, provided above the steam separator 4, to turn to dry steam. The dry steam is transferred through a main steam line 6, connected to the reactor pressure vessel 1, to a steam turbine to be used for power generation. The resulting water flows down a downcomer 7, provided between the reactor core 3 and the reactor pressure vessel 1, into a space below the reactor core 3.

The control rods are inserted into or withdrawn from the reactor core 3 through control rod guide tubes 8, which are provided below the reactor core 3. A plurality of control rod drive mechanisms 9 are provided below the control rod guide tubes 8 to control the insertion and withdrawal of the control rods.

A plurality of jet pumps 11 are provided in the downcomer 7 at circumferentially equal spacings. The recirculation pump, not shown, is provided outside the reactor pressure vessel 1. The recirculation pump, the jet pumps 11, and a recirculation line routed between the recirculation pump and the jet pumps 11 constitute a recirculation system. The recirculation pump supplies driving water to the jet pumps 11, so that the jet pumps 11 operate to provide forced circulation of the coolant 2 into the reactor core 3.

Figure 7:
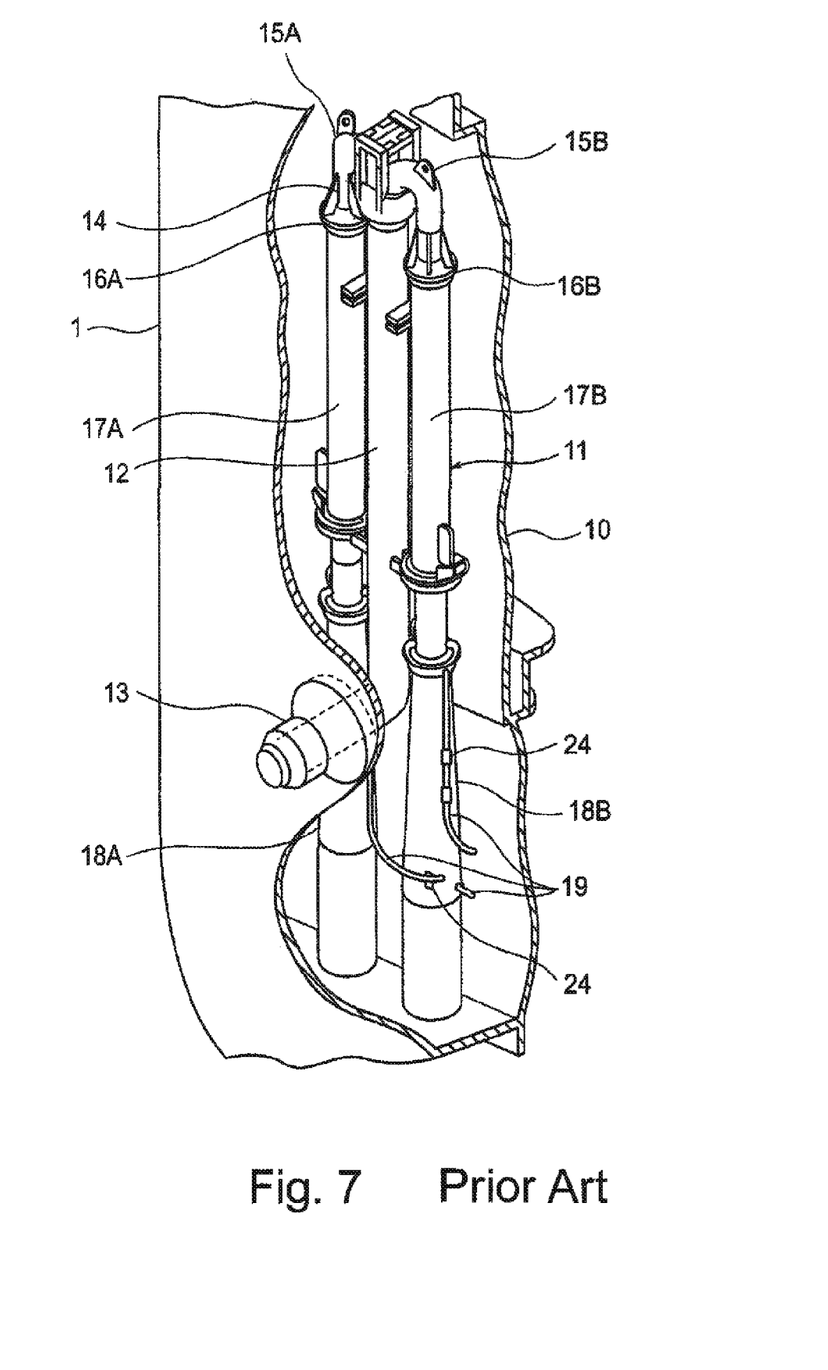
FIG. 7 is a perspective view of a jet pump arranged in the reactor.

FIG. 7 is a diagram of an arrangement of one of the jet pumps 11 in FIG. 6.

In FIG. 7, reference numeral 12 refers to a riser pipe of the jet pump 11. The riser pipe 12 is attached on the reactor pressure vessel 1. The riser pipe 12 is connected to a recirculation inlet nozzle 13 of the recirculation pump. The coolant 2 is supplied through the recirculation inlet nozzle 13 to the riser pipe 12 to be introduced into the reactor.

An upper portion of the riser pipe 12 is connected by a transition piece 14 to a pair of elbows 15A and 15B. The elbows 15A and 15B are connected through mixing nozzles 16A and 16B to inlet throats 17A and 17B, respectively. The inlet throats 17A and 17B are connected to diffusers 18A and 18B, respectively.

As the coolant 2 is jetted by the mixing nozzles 16A and 16B into the inlet throats 17A and 17B, the letting involves surrounding water, allowing the jets of the coolant 2 and the involved water to be mixed in the inlet throats 17A and 17B. The diffusers 18A and 18B then allow hydrostatic head to be restored.

To control power of a nuclear power plant with the reactor including the coolant recirculation system using the jet pumps 11 as described above, it is important to measure flow rates in the et pumps 11 during normal operation. For this purpose, flow rate measurement pipes 19 are provided on the diffusers 18A and 18B as illustrated in FIG. 7 to measure a static pressure difference between upper and lower portions of each of the diffusers 18 during the operation. The measurement is compared to a calibration value, which is a measurement taken before the operation of the plant, to calculate a flow rate of the jet pumps 11. The measurement pipes 19, which are welded to static pressure holes located at the upper and lower portions of the diffusers 18A and 18B, are supported by connecting members 24 fixed to the diffusers 18A and 18B.

Figure 8A:
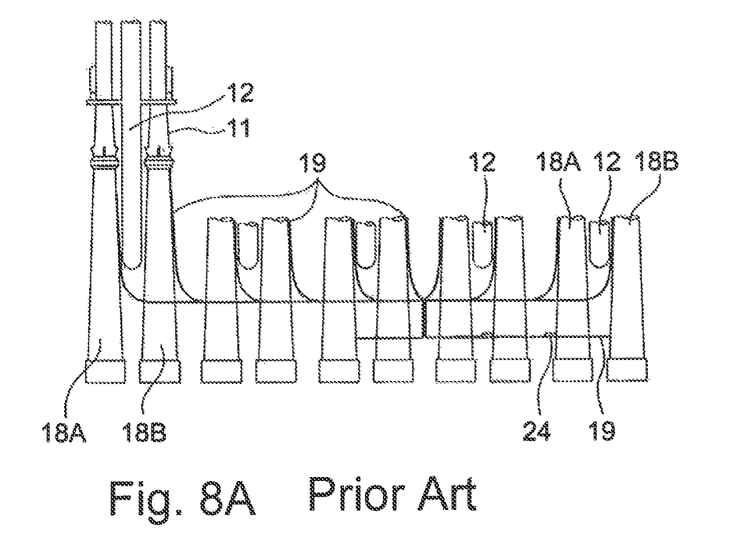
FIG. 8A is a side view of measurement pipes for measuring the flow rate of jet pumps.
Figure 8B:
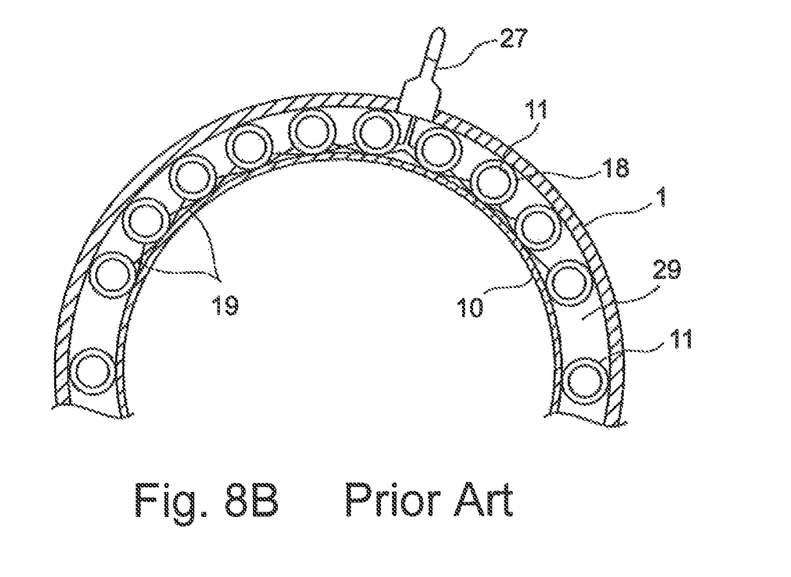
FIG. 8B is a sectional view of the measurement pipes for measuring the flow rate of the jet pumps.

As illustrated in FIGS. 8A and 8B, the measurement pipes 19 are arranged in an annular space 29 between the reactor pressure vessel 1 and the shroud 10. The measurement pipes 19 are routed in the annular space 29 in a complex manner to be connected through a jet pump measurement nozzle 27 to a pipe arrangement outside the reactor. Two such jet pump measurement nozzles 27 are symmetrically positioned in the reactor pressure vessel 1.

Because of flows of the coolant 2 fed from the recirculation pump, the jet pumps 11 as described above are used under more severe conditions than other devices. This results in significant load acting on components of the jet pumps 11. The measurement pipes 19, in particular, are affected by fluid oscillation around the diffusers 10 and other factors directly or via the connecting members 24, leading to a significant stress acting in the measurement pipes 19. The measurement pipes 19 thus may be susceptible to cracks and ruptures.

To reduce stress caused in the measurement pipes 19 due to the fluid oscillation and the like, various improvements have been traditionally made for the fixing of the measurement pipes 19.

In the event of a crack or a rupture caused in any of the measurement pipes 19 or its welded portion to a corresponding one of the connecting members 24 in the jet pump system in the reactor, it is necessary to conduct repair work from above the reactor core, which is located in a control area for radiation, in a remote manner. Additionally, this repair work involves underwater work.

It is desirable that the measurement pipes 19, when repaired, is fixed to a corresponding one of the diffusers 18A and 18B robustly so that stress to be applied to the welded portion to the connecting members 24 due to the fluid oscillation is reduced as much as possible. It is, however, extremely difficult to access the measurement pipes 19, which is located in the extremely narrow space, to fix it robustly from above the reactor core remotely.

As a solution to the issues described above, a reactor measurement-pipe maintenance clamp apparatus is provided which is capable of facilitating fixing a measurement pipes, routed in an extremely narrow space, robustly to the diffuser by remote control from above the reactor core and reducing stress in a welded portion of the measurement pipe to a support.

DETAILED DESCRIPTION

A reactor measurement-pipe maintenance clamp apparatus according to an embodiment is which fix a measurement pipe routed horizontally along a diffuser of a jet pump provided in a reactor pressure vessel of a boiling water reactor, the measurement pipe being welded on a connecting member at a side of the diffuser, the clamp apparatus including:

a body frame having a vertical block and a horizontal block, the vertical block being attached to an outer surface of the diffuser, the horizontal block being perpendicular to the vertical block;

a first clamp mechanism including a plurality of clamps which fix the measurement pipe between the clamps, a plurality of clamp operation bolts provided vertically in the horizontal block of the body frame in such a manner that the clamp operation bolts are allowed to be turned by remote control from above a reactor core, and a plurality of wedge mechanisms which convert the turning of the plurality of clamp operation bolts to displacement of the plurality of clamps in a radial direction of the diffuser to generate clamping forces for fixing the measurement pipe; and a second clamp mechanism including a support clamp which hold the connecting member, a support clamp operation bolt provided vertically in the horizontal block of the body frame in such a manner that the support clamp operation bolt is allowed to be turned by remote control from above the reactor core, and a wedge mechanism which convert the turning of the support clamp operation bolt to displacement of the support clamp in a tangential direction of the diffuser to generate a clamping force for fixing the connecting member.

The reactor measurement-pipe maintenance clamp apparatus according to the embodiment will now be described with reference to the drawings.

Figure 5:
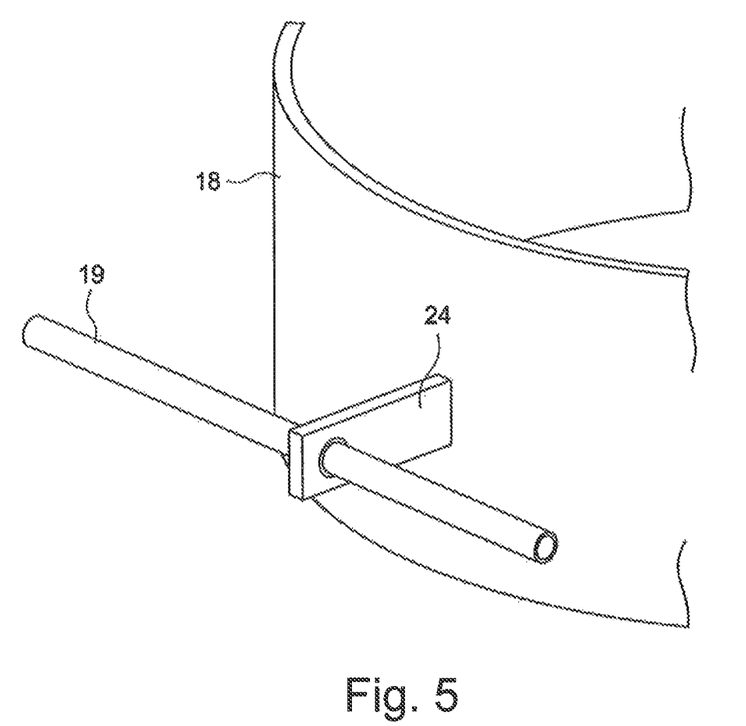
FIG. 5 is a perspective view of a measurement pipe to be fixed by the reactor measurement-pipe maintenance clamp apparatus.

FIG. 5 is a diagram of a measurement pipe 19 fixed to a side of a diffuser 18 in a jet pump system in a reactor, with the measurement pipe 19 not clamped by the clamp apparatus. A connecting members 24 is fixed to the side of the diffuser 18. The measurement pipe 19 is welded on the connecting members 24 and held horizontally.

Figure 1:
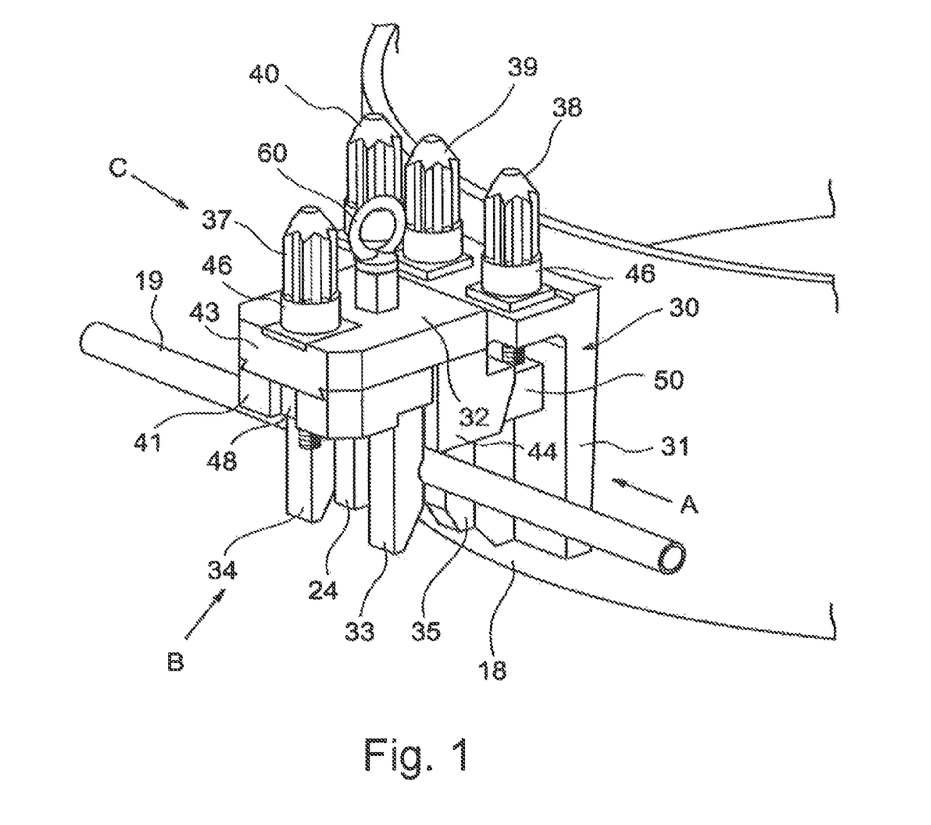
FIG. 1 is a perspective view of a reactor measurement-pipe maintenance clamp apparatus according to an embodiment of the invention.
Figure 2:
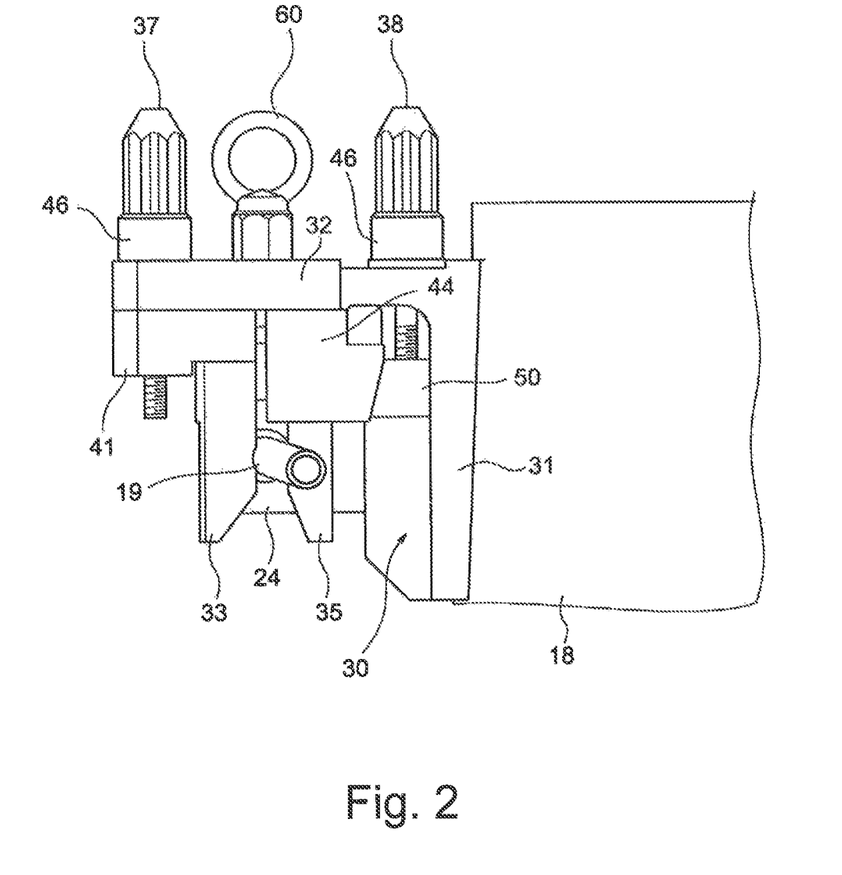
FIG. 2 is a side view of the reactor measurement-pipe maintenance clamp apparatus observed from direction A in FIG. 1.
Figure 3:
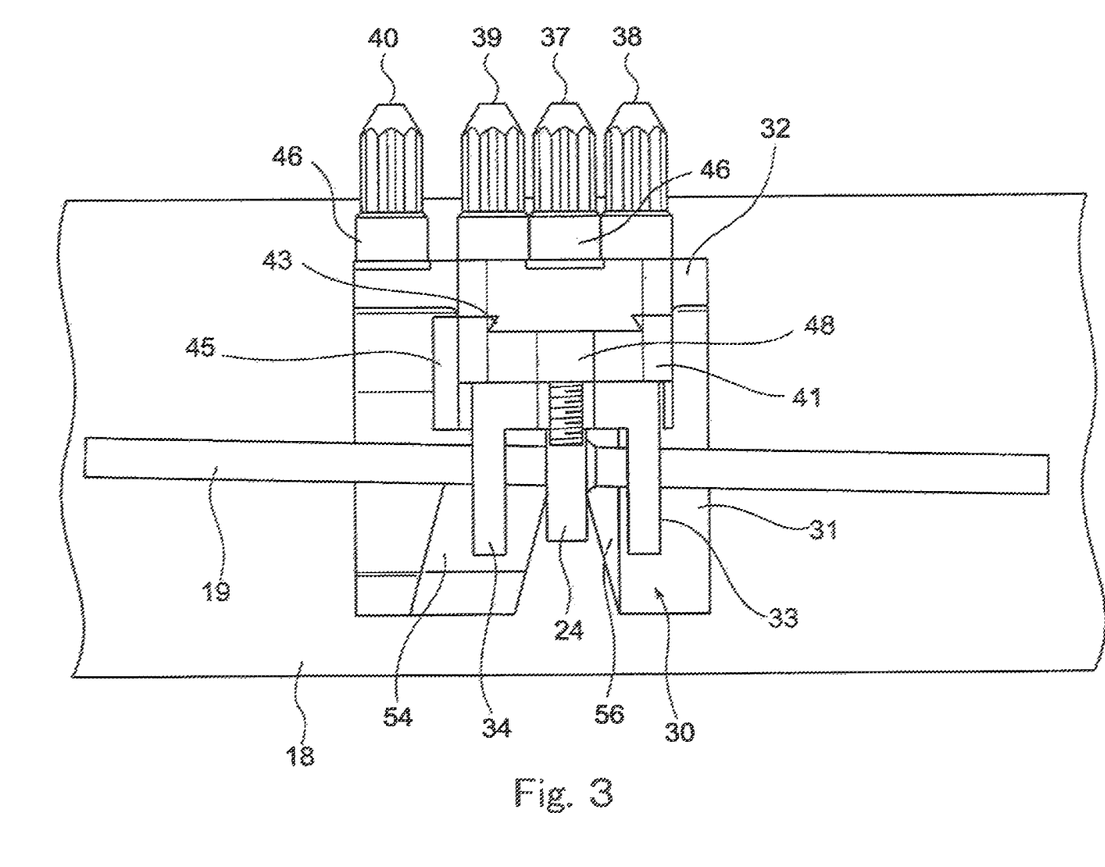
FIG. 3 is a side view of the reactor measurement-pipe maintenance clamp apparatus observed from direction B in FIG. 1.
Figure 4:
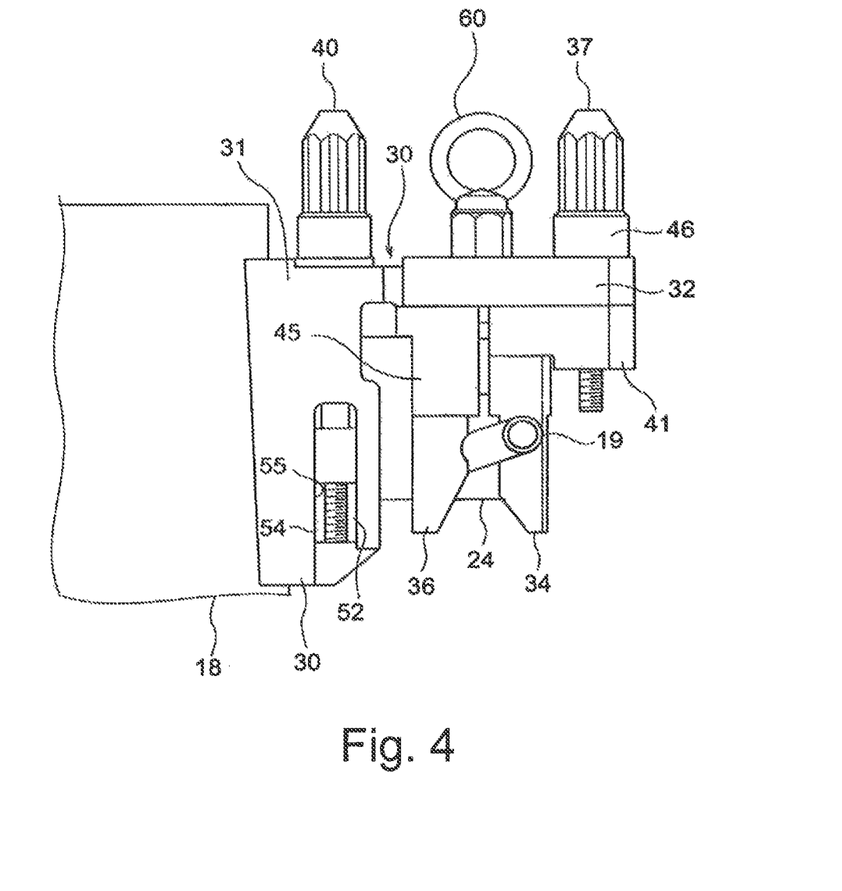
FIG. 4 is a side view of the reactor measurement-pipe maintenance clamp apparatus observed from direction C in FIG. 1.

FIG. 1 is a diagram of the measurement pipe 19 clamped by the clamp apparatus. FIG. 2 is a side view of the clamp apparatus observed from arrow direction A in FIG. 1; FIG. 3 is a side view of the clamp apparatus observed from arrow direction B in FIG. 1; and FIG. 4 is a side view of the clamp apparatus observed from arrow direction C in FIG. 1.

The clamp apparatus includes a substantially L-shaped body frame 30. The body frame 30, which is arranged in a narrow space between an outer surface of the diffuser 18 and the measurement pipe 19, has a vertical block 31 to be attached to the outer surface of the diffuser 18 and a horizontal block 32 extending horizontally from the top end of the vertical block 31. The vertical block 31 includes at its back a contact surface having a curvature identical with that of the outer surface of the diffuser 18.

The clamp apparatus according to this embodiment includes a first clamp mechanism using four clamps 33, 34, 35, and 36 to grip the measurement pipe 19 and a second clamp mechanism holding the connecting member 24 on opposite sides of the connecting member 24. Reference numerals 37, 38, 39, and 40 refer to washer-faced bolts, which are clamp operation bolts to operate the clamp mechanisms. The washer-faced bolts 37, 38, 39, and 40 each have at their heads a plurality of grooves in an axial direction.

(First Clamp Mechanism)

An arrangement of the first clamp mechanism will now be described. In FIG. 1, a first slider 41 is mounted on a lower surface of the horizontal block 32 of the body frame 30. A guide portion 43 is formed also in the lower surface of the horizontal block 32, and the first slider 41 is mounted slidably along the guide portion 43 in a radial direction of the diffuser 18. The two clamps 33 and 34, which are to grip the measurement pipe 19 on one side, are retained vertically at a predetermined spacing under the first slider 41.

As illustrated in FIGS. 1 and 4, a second slider 44 and a third slider 45 are also mounted on the lower surface of the horizontal block 32 of the body frame 30 slidably along a guide portion, not shown. The clamp 35 is supported vertically under the second slider 44, and the clamp 36 is supported vertically under the third slider 45. The clamps 35 and 33 face each other to grip the measurement pipe 19 on opposite sides of the measurement pipe 19, and so do the clamps 36 and 34.

The first washer-faced bolt 37 is mounted vertically through a washer 46 on an upper surface of the horizontal block 32 of the body frame 30. The first washer-faced bolt 37 is coupled to a wedge mechanism that converts the turning of the first washer-faced bolt 37 to the horizontal displacement of the cleans 33 and 34. As illustrated in FIG. 3, a first wedge block 48 is screwed onto the threaded shaft of the first washer-faced bolt 37, so that the turning of the first washer-faced bolt 37 displaces the first wedge block 48 up and down. The first wedge block 48 has a slanted wedge surface in contact with a slanted surface formed at a rear end of the first slider 41. This arrangement yields a wedging action to push out the first slider 41 as the first washer-faced bolt 37 is turned to displace the first wedge block 48 upward, so that the clamps 33 and 34, which are integrated with the first slider 41, are pressed against the measurement pipe 19.

As illustrated in FIGS. 1 and 2, the second washer-faced bolt 38 is mounted vertically through a washer 46 on the upper surface of the vertical block 31 of the body frame 30. A second wedge block 50 having a wedge surface is screwed onto the threaded shaft of the second washer-faced bolt 38. The wedge surface of the second wedge block 50 is in contact with a slanted surface formed at the back of the second slider 44.

The third washer-faced bolt 39 is also mounted vertically through a washer 46 on the upper surface of the vertical block 31 of the body frame 30. The third washer-faced bolt 39 is coupled to a wedge mechanism similar to that for the second washer-faced bolt 38. A third wedge block (not shown) screwed onto the threaded shaft of the third washer-faced bolt 39 has a wedge surface in contact with a slanted surface of the third slider 45.

Thus, as the second washer-faced bolt 30 and the third washer-faced bolt 39 are turned, the wedging action of the second wedge block 50 and the third wedge block, not shown, causes the clamp 35, which is integrated with the second slider 44, and the clamp 36, which is integrated with the third slider 45, to be pressed against the measurement pipe 19.

(Second Clamp Mechanism)

The second clamp mechanism will now be described. With reference to FIGS. 3 and 4, the fourth washer-faced bolt 40, which is mounted vertically through a washer 46 on the horizontal block 32 of the body frame 30 at a longitudinal end of the horizontal block 32, is to operate the second clamp mechanism. A fourth wedge block 52 is screwed onto the threaded shaft of the fourth washer-faced bolt 40. A clamp plate 54 is provided at the vertical block 31 of the body frame 30 movably in parallel with a tangential direction of the diffuser 18 and in a horizontal direction. In this embodiment, a guide groove 55 to guide the clamp plate 54 is formed in the vertical block 31 as illustrated in FIG. 4. The clamp plate 54 is fitted slidably in the guide groove 55.

The fourth wedge block 52 has a wedge surface that slides in contact with a slanted surface formed at a rear end of the clamp plate 54. As the fourth washer-faced bolt 40 is turned to raise the fourth wedge block 52, the clamp plate 54 is pushed out in the horizontal direction toward the connecting member 24 that supports the measurement pipe 19. A fixing clamp 56 is fixed on the body frame 30 at a position of the body frame 30 where the connecting member 24 is held between the body frame 30 and the clamp plate 54. The body frame 30 is fixed to the diffuser 18 in a manner such that the fixing clamp 56 is in contact with the connecting member 24. The clamp plate 54 has an end surface, which is in contact with the connecting member 24 and desirably has one or more projection for engagement with the connecting member 24.

An operation and effect of the reactor measurement-pipe maintenance clamp apparatus according to the embodiment, which has the structure as described above, will now be described.

With reference to FIG. 5, the measurement pipe 19, when it has been repaired, is welded onto the connecting member 24 to be fixed to the side of the diffuser 18. The clamp apparatus is then suspended by a wire through an eyebolt 60, as illustrated in FIG. 1, from above the reactor core to allow the vertical block 31 to be welded onto the side of the diffuser 18. With the vertical block 31 welded, the clamps 33 and 34 are placed opposite to the clamps 35 and 36 with the measurement pipe 19 therebetween. The connecting member 24 that supports the measurement pipe 19 is placed between the clamp 33 and the clamp 34 and between the clamp 35 and the clamp 36.

A clamp operation to enable the clamps 33 and 34 and the clamps 35 and 36 to grip the measurement pipe 19 will now be described.

A nut of a bolt tightening tool, which is not shown and suspended from above the reactor core, is fitted onto each of the heads of the second washer-faced bolt 38 and the third washer-faced bolt 39, which are among the four washer-faced bolts 37, 38, 39, and 40 located on upper surface of the body frame 30. The bolt tightening tool is used to torque and turn the second washer-faced bolt 38 and the third washer-faced bolt 39 to thereby raise the second wedge block 50 and the third wedge block, not shown. Through the wedging action, the clamp 35, which is integrated with the second slider 44, and the clamp 36, which is integrated with the third slider 45, are pushed out until the clamps 35 and 36 come into contact with the measurement pipe 19.

The nut of the undepicted bolt tightening tool, which is suspended from above the reactor core, is then fitted onto the head of the fourth washer-faced bolt 40. The fourth washer-faced bolt 40 is turned to raise the fourth wedge block 52. This pushes out the clamp plate 54 toward the connecting member 24 of the measurement pipe 19 to fix the connecting member 24 between the clamp plate 54 and the fixing clamp 56.

The nut of the undepicted bolt tightening tool, suspended from above the reactor core, is then fitted onto the head of the first washer-faced bolt 37 to turn the first washer-faced bolt 37. As the first washer-faced bolt 37 is turned, the first wedge block 48 is raised upward. Through the wedging action, the first slider 41 is pushed out to press the clamps 33 and 34, which are integrated with the first slider 41, against the measurement pipe 19 and thereby fix the measurement pipe 19 between the clamps 33 and 34 and the clamps 35 and 36.

The washer-faced bolts 37, 38, 39, and 40 are, then, each tightened to a specified torque. As a result, the washers 46 prevent the washer-faced bolts 37, 38, 39, and 40 from turning.

The measurement pipe 19, routed in a narrow space between the core shroud and the diffuser 18 of the jet pump 11, can be fixed to the side of the diffuser 18 by underwater remote control from above the reactor core with reliability and efficiency in the manner described above. Additionally, this allows the measurement pipe 19 and the connecting member 24 that supports the measurement pipe 19 to be fixed together to the diffuser 18 robustly, resulting in reduced stress caused to a welded portion between the measurement pipe 19 and the connecting member 24 due to fluid oscillation. Because of this, the maintenance of the measurement pipe 19 and its welded portion can be maintained for a prolonged period without a crack or the like.

Additionally, the clamp operation, which is performed above the reactor core in the control area for radiation, involves merely tightening the washer-faced bolts 37, 38, 39, and 40 by remote control, provides easy access, and requires merely a simple operation. This can reduce operation time and thereby reduce the radiation exposure levels of operators significantly.

1 . . . reactor pressure vessel, 2 . . . coolant, 3 . . . reactor core, 4 . . . steam separator, 7 . . . downcomer, 8 . . . control rod guide pipe, 11 . . . jet pump, 18 . . . diffuser, 19 . . . measurement pipe, 24 . . . connecting member, 30 . . . body frame, 31 . . . vertical block, 32 . . . horizontal block, 33,34,35,36 . . . clamp, 37,38,39,40 . . . washer-faced bolt,

41 . . . first slider, 44 . . . second slider, 45 . . . third slider, 46 . . . washer, 48 . . . first wedge block, 50 . . . second wedge block, 52 . . . fourth wedge block, 54 . . . clamp plate, 56 . . . fixing clamp

What is claimed is:

1. A reactor measurement-pipe maintenance clamp apparatus which fixes a measurement pipe routed horizontally along a diffuser of a jet pump provided in a reactor pressure vessel of a boiling water reactor, the measurement pipe being welded on a connecting member at a side of the diffuser, the clamp apparatus comprising:
    a body frame having a vertical block and a horizontal block, the vertical block being attached to an outer surface of the diffuser, the horizontal block being perpendicular to the vertical block;
    a first clamp mechanism including a plurality of clamps which fix the measurement pipe between the clamps, a plurality of first clamp operation bolts provided vertically in the horizontal block of the body frame in such a manner that the first clamp operation bolts are allowed to be turned by remote control from above a reactor core, and a plurality of wedge mechanisms which convert the turning of the plurality of clamp operation bolts into displacement of the plurality of clamps along a radial direction of the diffuser to generate clamping forces for fixing the measurement pipe; and
    a second clamp mechanism including a fixing clamp fixed to the body frame and contacting the connecting member, a clamp plate which is movable in a tangential direction of the diffuser and is provided to the connecting member, a second clamp operation bolt provided vertically in the horizontal block of the body frame in such a manner that the second clamp operation bolt is allowed to be turned by remote control from above the reactor core, and a wedge mechanism which converts the turning of the second clamp operation bolt to displacement of the clamp plate in the tangential direction of the diffuser to generate a clamping force for fixing the connecting member by sandwiching the connecting member with the clamp plate and the fixing clamp in the tangential direction of the diffuser.

2. The reactor measurement-pipe maintenance clamp apparatus according to claim 1, wherein the vertical block of the body frame includes a contact surface having a curvature identical with that of the outer surface of the diffuser, and the vertical block includes a component that is allowed to be arranged in a narrow space between the outer surface of the diffuser and the measurement pipe.

3. The reactor measurement-pipe maintenance clamp apparatus according to claim 1, wherein the first clamp mechanism further comprises:
    a first fixing mechanism including:
        a first wedge block which is screwed onto a threaded shaft of a first clamp operation bolt, the first wedge block having a wedge surface;
        a first slider engaged on the horizontal block of the body frame slidably along a radial direction of the diffuser, the first slider being in close contact with the wedge surface of the first wedge block, the first slider pushed radially inward toward the measurement pipe by vertical displacement of the first wedge block; and
        a first clamp fixed on the first slider to grip the measurement pipe on one side, and
    a second fixing mechanism including:
        a second wedge block and a third wedge block which are screwed onto threaded shafts of a second clamp operation bolt and a third clamp operation bolt, respectively, the second and third wedge blocks each having a wedge surface;
        a second slider and a third slider engaged on the horizontal block of the body frame slidably along a radial direction of the diffuser, the second and third sliders being in close contact with the wedge surfaces of the second and third wedge blocks, respectively, the second and third sliders pushed radially outward toward the measurement pipe by vertical displacement of the second and third wedge blocks; and
        a second clamp and a third clamp fixed on the second and third sliders, respectively, to grip the measurement pipe on the opposite side.

4. The reactor measurement-pipe maintenance clamp apparatus according to claim 3, wherein the first fixing mechanism holds the measurement pipe on both sides of the connecting member.

5. The reactor measurement-pipe maintenance clamp apparatus according to claim 1, wherein the second clamp mechanism further comprises:
    a fourth wedge block which is screwed onto a threaded shaft of the support clamp operation bolt, the fourth wedge block having a wedge surface; and
    a fixing clamp fixed on the vertical block of the body frame to hold the connecting member between the fixing clamp and the clamp plate, wherein
    the clamp plate is engaged on a vertical block of the body frame slidably in the tangential direction and is in close contact with the wedge surface of the fourth wedge block, the clamp plate being pushed toward the connecting member by vertical displacement of the fourth wedge block.

6. The reactor measurement-pipe maintenance clamp apparatus according to claim 5, wherein the clamp plate has an end surface to grip the connecting member, and the end surface has a projection for engagement with the connecting member.

7. The reactor measurement-pipe maintenance clamp apparatus according to claim 1, wherein the plurality of clamp operation bolts and the support clamp operation bolt are attached with washers to an upper surface of the body frame.

* * * * *